(12) United States Patent
Friday et al.

(10) Patent No.: US 7,115,152 B2
(45) Date of Patent: Oct. 3, 2006

(54) FOUR BED REGENERABLE FILTER SYSTEM

(76) Inventors: David K. Friday, 13 Iron Mill Garth, Hunt Valley, MD (US) 21030; John L. Creed, 1983 Oriel Rodgers Rd., Girard, OH (US) 44420

( * ) Notice: Subject to any disclaimer, the term of this patent is extended or adjusted under 35 U.S.C. 154(b) by 308 days.

(21) Appl. No.: 10/754,837

(22) Filed: Jan. 12, 2004

(65) Prior Publication Data
US 2005/0150377 A1  Jul. 14, 2005

(51) Int. Cl.
*B01D 53/04* (2006.01)
(52) U.S. Cl. .................. 95/1; 95/14; 95/21; 95/115; 95/148; 96/109; 96/112; 96/126; 96/130; 96/131; 96/132; 96/135; 96/143; 96/144; 96/146
(58) Field of Classification Search .............. 95/4, 95/21, 96, 97, 148, 1, 14, 114, 115; 96/109, 96/112, 121, 126, 130, 143, 146, 131, 132, 96/135, 144
See application file for complete search history.

(56) References Cited

U.S. PATENT DOCUMENTS

| | | | |
|---|---|---|---|
| 3,109,722 A * | 11/1963 | Dow | 95/21 |
| 3,359,706 A | 12/1967 | Zankey | |
| 3,523,408 A | 8/1970 | Rosenberg | |
| 4,105,562 A | 8/1978 | Kaplan et al. | |
| 4,197,095 A | 4/1980 | White, Jr. et al. | |
| 4,247,311 A | 1/1981 | Seibert et al. | |
| 4,482,365 A | 11/1984 | Roach | |
| 4,537,748 A | 8/1985 | Billiet | |
| 4,564,376 A | 1/1986 | Billiet | |
| 4,676,807 A | 6/1987 | Miller et al. | |
| 4,696,687 A | 9/1987 | Billiet et al. | |
| 4,786,298 A | 11/1988 | Billiet et al. | |
| 4,793,832 A | 12/1988 | Veltman et al. | |
| 4,838,905 A | 6/1989 | Billiet et al. | |
| 4,882,648 A | 11/1989 | Verrando, III | |

(Continued)

FOREIGN PATENT DOCUMENTS

EP  1 155 729  11/2001

(Continued)

*Primary Examiner*—Robert A. Hopkins (57) ABSTRACT

A regenerable filter system includes a flow path along which a stream of fluid flows between an inlet and an outlet. A first filtering unit is located in the flow path. The first filter unit includes first and second regenerable filter beds, wherein each bed has a first adsorbent for removing a first contaminant from the fluid stream. A first valve is located between the inlet and the first and second filter beds for selectively directing the fluid stream through one of the first and the second filter beds. The other of the first and second filter beds is removed from the flow path. A second filtering unit is located in the flow path between the first filtering unit and the outlet. The second filtering unit includes third and fourth regenerable filter beds for removing a second contaminant from the stream of fluid. A second valve is located between the first filtering unit and the third and fourth filter beds for selectively directing the stream of fluid through one of the third and fourth filter beds, wherein the other of the third and fourth filter beds is removed from the flow path. A controller operates the first valve such that the stream of fluid is directed through one of the first and second filter beds. The second valve is so operated that the stream of fluid is directed through one of the third and fourth filter beds. The first and second filter beds are cycled independent of one another.

56 Claims, 4 Drawing Sheets

U.S. PATENT DOCUMENTS

| | | | |
|---|---|---|---|
| 4,983,190 A | 1/1991 | Verrando et al. |
| 5,129,332 A | 7/1992 | Greco |
| 5,129,929 A | 7/1992 | Linnersten |
| 5,226,937 A | 7/1993 | Linnersten et al. |
| 5,271,842 A | 12/1993 | Degen et al. |
| 5,279,235 A | 1/1994 | Greco |
| 5,302,354 A | 4/1994 | Watvedt et al. |
| 5,429,663 A | 7/1995 | Cassidy et al. |
| 5,531,220 A | 7/1996 | Cassidy |
| 5,661,987 A | 9/1997 | Zarate |
| 5,664,995 A | 9/1997 | O'Keefe |
| 5,665,143 A | 9/1997 | Jarvis et al. |
| 5,766,486 A | 6/1998 | Cathcart et al. |
| 5,829,139 A | 11/1998 | Murphy et al. |
| 5,927,084 A | 7/1999 | Fielding |
| 5,931,022 A | 8/1999 | Deng et al. |
| 5,989,432 A | 11/1999 | Gildersleeve et al. |
| 6,319,303 B1 | 11/2001 | Guillard et al. |
| 6,344,070 B1 | 2/2002 | Banks |
| 6,391,197 B1 | 5/2002 | Billiet |
| 6,409,786 B1 | 6/2002 | Wright et al. |
| 6,416,563 B1 | 7/2002 | Wright et al. |
| 6,494,936 B1 | 12/2002 | Peacock |
| 6,508,862 B1 | 1/2003 | Tonkovich et al. |
| 6,511,640 B1 | 1/2003 | Kumar et al. |
| 6,514,323 B1 | 2/2003 | Palermo et al. |
| 2002/0005117 A1 | 1/2002 | Cassidy |
| 2003/0037672 A1 | 2/2003 | Sircar |

FOREIGN PATENT DOCUMENTS

| | | |
|---|---|---|
| GB | 2 238 490 | 6/1991 |
| WO | WO 02/12796 A2 | 2/2002 |

* cited by examiner

FIG. 1

POSITION 1

FIG. 2A

POSITION 2

FIG. 2B

|  | V1 | V2 | V3 |
|---|---|---|---|
| FEED A & C | 1 | 1 | 1 |
| FEED B & D | 2 | 1 | 2 |
| FEED A & D | 1 | 2 | 2 |
| FEED B & C | 2 | 2 | 1 |

WATER ADSORPTION ON BPL ACTIVATED CARBON
(DATA FROM LEVAN et. al)

FIG. 5

FOUR BED REGENERABLE FILTER SYSTEM

The invention relates to the art of filtering and, more particularly, to a filtering system for removing more than one contaminant from a gas or fluid.

INCORPORATION BY REFERENCE

The present invention relates to filtering systems for removing contaminants from a gas or fluid. U.S. Publication No. 2002/0005117 discloses a filtering system for removing chemical and biological agents from air and is hereby incorporated by reference as background material for showing the same. U.S. Pat. No. 6,319,303 discloses a four bed filtering system for gas and is hereby incorporated by reference as background material for showing the same.

BACKGROUND OF THE INVENTION

It is known that microporous adsorbents can be used to remove a contaminant from gas and liquids. However, adsorbents such as activated carbon become saturated with the contaminant and must be replaced by fresh adsorbents to maintain the desired performance of the filtration system. This can be costly and can be labor intensive in view of the environment in which filtering systems are often utilized. Furthermore, constantly replacing the adsorbent material can lead to human error wherein the adsorbent is still in service after its useful life.

In order to overcome the problems associated with changing out filters once the adsorbent becomes saturated, systems have been designed which utilize adsorbents that can be regenerated and reused. In general terms, there are two types of regenerable systems. The first is a pressure swing adsorption system and the other is a thermal (temperature) swing adsorption system. These systems allow a filter bed with an adsorbent material to be used over and over. In operation, a fluid is introduced into a filter bed wherein the adsorbent material removes a contaminant from the fluid. The filter bed includes sufficient amount of the adsorbent material to continue to remove the contaminant from the fluid stream for a designated period of time. At that point, the adsorbent material is at least partially saturated with the contaminant from the contaminated fluid stream. In order to remove the contaminant from the adsorbent material, a regeneration process is performed on the filter bed. As stated above, this can include pressure swing regeneration or temperature swing regeneration. However, during the regeneration process, the filter bed cannot be used to filter the contaminant from the fluid stream. Therefore, a second filter bed is usually provided, such that the second bed is in use when the first one is being regenerated and vice versa.

Temperature swing regeneration utilizes heat to remove the contaminant from the adsorbent material to allow the adsorbent material to be reused. There are many industries which utilize thermal or temperature swing adsorption processes. These applications include solvent recovery, air drying and removing contaminants such as $CO_2$ and $H_2O$ from air prior to cryogenic separation. While temperature swing adsorption is an effective way to maintain the filters in a filter system, it can be expensive due to the high energy costs associated with producing the heat necessary to regenerate the filters.

Pressure swing adsorption (PSA) utilizes a pressurized regeneration gas that is introduced to the filter beds in a direction reverse to the flow of the higher pressure feed gas containing the contaminants. By passing low pressure gas in this reverse direction, the contaminants are removed from the adsorbent(s) so that the adsorbent(s) can be reused. As with the thermal swing adsorption system discussed above, the PSA system can also be expensive to operate due to the power consumption associated with pressurizing the feed gas, which typically necessitates a compressor and/or access to an industrial process which utilizes compressed gas. The items may not be conveniently available for certain applications. In addition, the purge gas requirements for PSA systems increase significantly as the adsorption isotherm for the given contaminants becomes more favorable. But favorable adsorption isotherms are needed to achieve high product purity with a reasonable volume of adsorbent. Therefore, achieving high purity product gas using PSA typically requires many beds and complicated cycles.

As is stated above, while use of a regenerable adsorbent can overcome some of the problems associated with replaceable adsorbents, the regeneration process necessitates the filter bed being at least partially pulled offline for the regeneration process. As a result, while the filter bed is being regenerated, the filtering system cannot process contaminated gas. This necessitates the system being shut down during the regeneration process. In order to overcome this problem, multiple filter beds have been utilized to allow one filter bed to be online and removing contaminants from the contaminated gas while the other filter bed is in a regeneration stage. While this overcomes the problems associated with shutting down the filter system for regeneration, it doesn't overcome the high energy requirements of the system. The energy requirements of the system is even a greater problem when the system is designed to remove more than one contaminant from the gas and/or when it is utilized at a remove location.

Accordingly, it has been considered desirable to develop a new and improved regenerable filter system which overcomes the foregoing difficulties and others and provides more advantageous results.

SUMMARY OF THE INVENTION

In accordance with a first aspect of the present invention, a regenerable filter system includes a flow path along which a stream of fluid flows between an inlet and an outlet and a first filtering unit in the flow path between the inlet and the outlet. The first unit includes first and second regenerable filter beds and each bed including a first adsorbent for removing a first contaminant from the stream of fluid. The filter system further includes a first valve located between the inlet and the first and second filter beds for selectively directing the stream of fluid through one of the first and second filter beds. The other of the first and second filter beds is removed from the flow path. The filter system further includes a second filtering unit in the flow path between the first filtering unit and the outlet. The second unit is located downstream from the first unit and includes third and fourth regenerable filter beds, with each bed including a second adsorbent for removing a second contaminant from the stream of fluid. The filter system also includes a second valve located between the first filtering unit and the third and fourth filter beds for selectively directing the stream of fluid through one of the third and fourth filter beds. The other of the third and fourth filter beds is removed from the flow path. The filter system further includes a controller for operating the first valve to direct the stream of fluid through a desired one of the first and second filter beds and for operating the second valve to direct the stream of fluid through a desired one of the third and fourth filter beds, wherein the first and second filtering units are operated independent of one another.

According to another aspect of the present invention, a method of removing at least a first and a second contaminant from a stream of fluid includes the steps of providing the stream of fluid; directing the stream of fluid through a filtering system having a first filtering unit with first and second regenerable filter beds and a second filtering unit with third and fourth regenerable filters beds, the first and second filtering units being in fluid connection with one another; filtering a first contaminant from the stream of fluid in the first filtering unit; filtering a second contaminant from the stream of fluid in the second filtering unit; regenerating one of the first and second filter beds of the first filtering unit; and, regenerating one of the third and fourth filter beds of the second filtering unit independent of the step of regenerating the one of the first and second filter beds.

In accordance with still another aspect of the present invention, a regenerable filter system includes a first flow path along which a stream of process fluid flows between a process fluid inlet and a process fluid outlet; and a first filter unit in the first flow path. The first filter unit includes a first regenerable filter bed having a first adsorbent for removing a first contaminant from the stream of fluid. A second filter unit is provided in the first flow path, the second unit being located between the first unit and the outlet of the first flow path. The second unit includes a second regenerable filter bed having a second adsorbent for removing a second contaminant from the stream of fluid. A second flow path is provided in the system along which a stream of regeneration fluid flows between a regeneration fluid inlet and a regeneration fluid outlet. A controller selectively directs the process fluid through the first flow path and the regeneration fluid through the second flow path, wherein a regeneration cycle of the first filter unit is independent of a regeneration cycle of the second filter unit.

BRIEF DESCRIPTION OF THE DRAWINGS

The foregoing material on the filtering system of this application will in part be obvious and in part be pointed out more fully hereinafter in connection with a written description of preferred embodiments of the present invention, illustrated in the accompanying drawings in which.

DESCRIPTION OF THE PREFERRED EMBODIMENTS

Figure 1:
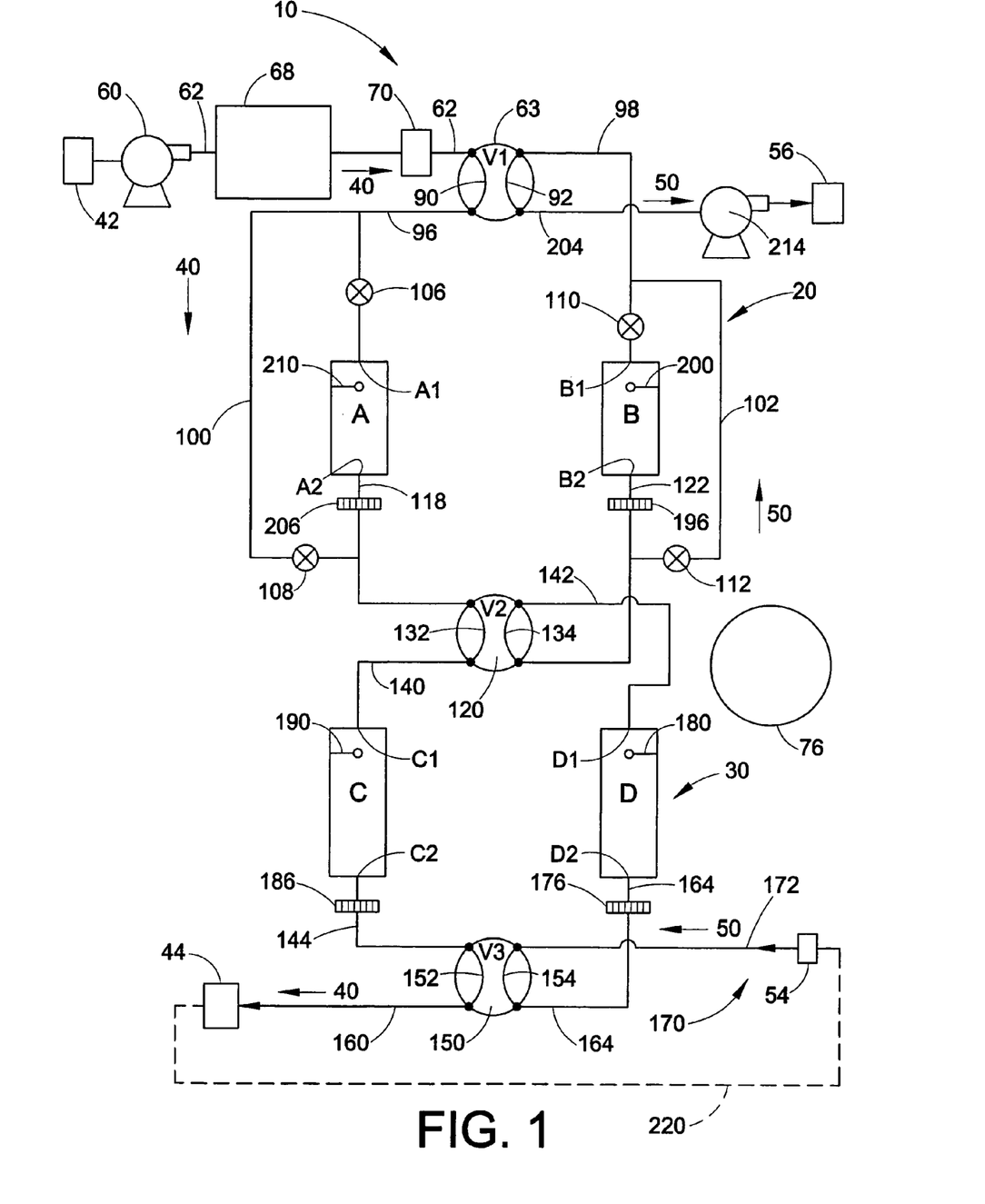
FIG. 1 is a schematic representation of a four bed regenerable filter system in accordance with the present invention.

Referring now in greater detail to the drawings wherein the showings are for the purpose of illustrating preferred embodiments of the invention only, and not for the purpose of limiting the invention, FIG. 1 illustrates a filtering system 10 having a first filter unit 20 and a second filter unit 30. Filter system 10 further includes a flow path 40 which can be any known fluid flow containment arrangement for maintaining a flow of fluid between an inlet and an outlet. This can include, but is not limited to, any known piping and/or ductwork capable of maintaining a fluid flow. Flow path 40 begins at a feed gas inlet 42 and ends at clean product outlet 44. In general terms, flow path 40 directs a contaminated feed gas or fluid through filter system 10 and further controls the fluid flow of a clean product fluid out of filter system 10. The individual components of flow path 40 will be discussed in greater detail below in connection with the remaining structure of the filter system.

System 10 further includes a regeneration gas flow path 50 which shares some of the structure of flow path 40 to direct a regeneration gas between a regeneration gas inlet 54 and a regeneration gas outlet 56. Regeneration flow path 50 will also be discussed in greater detail below.

Starting at the gas inlet 42 and working downstream to clean product outlet 44, filter system 10 can include a fluid pump 60 to increase and/or create pressure in the feed gas as it passes through flow path 40. Adjacent to inlet 42 is line 62 which directs the feed gas between inlet 42 and a first valve 63. Line 62 can include a cooling and/or heating unit 68 that can be used to create an optimal feed gas temperature for promoting efficient filtration of the contaminated feed gas based on the adsorbent used in filter system 10. Cooling and/or heating unit 68 can further be used to create an optimal humidity or moisture level in the contaminated feed gas. Cooling the feed gas to a temperature at or below its dew point temperature removes water via condensation. However, the air is now at or near 100% relative humidity. Therefore one must perform an additional drying step or heat the air up to reduce the relative humidity. This can further maximize the efficiencies of filter system 10. System 10 can further include a temperature and relative humidity control device 70 which includes sensors in line 62 wherein control device 70 monitors the temperature and/or relative humidity of the feed gas as it exits cooling and/or heating device 68 and, then, adjusts the operation of the device 68 as needed to obtain the optimal feed gas temperature and/or relative humidity before the feed gas enters the first filter unit 20. The device 68 can first cool the feed gas to reduce its water content and then heat it again to a desired temperature to control the relative humidity. Alternatively, separate cooling and heating units can be provided for the system.

Control device 70 can also be in communication with a system control 76 which will be discussed in greater detail below. Control device 70 can be any known sense and control apparatus which can sense temperatures and/or relative humidity of fluids and control another apparatus based on this information. Furthermore, control device 70 can further include a pressure sensor (not shown) wherein the control device 70 can communicate with fluid pump 60 to maintain a desired fluid pressure through system 10. It should also be noted that units 68 and 70 can be positioned in other portions of flow path 40 or even in flow path 50 to maintain a desired fluid state. This can be true if subsequent filtering units have different optimal operating conditions, which will be discussed in greater detail below. Pump 60, cooling and/or heating unit 68, humidity control device 70, and sensors can be any of those known in the art. Further, it should be noted that an evaporator can be utilized in cooling/heating unit 68 to cool incoming feed gas.

Figure 2A:
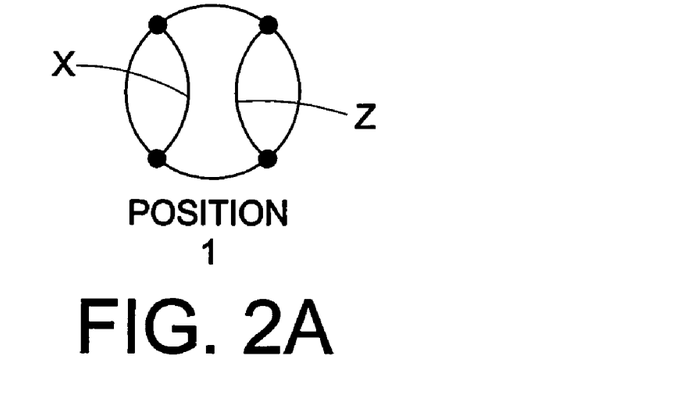
FIGS. 2A and 2B are a pictorial representation of positions 1 and 2 of the valves of the filter system of FIG. 1.
Figure 2B:
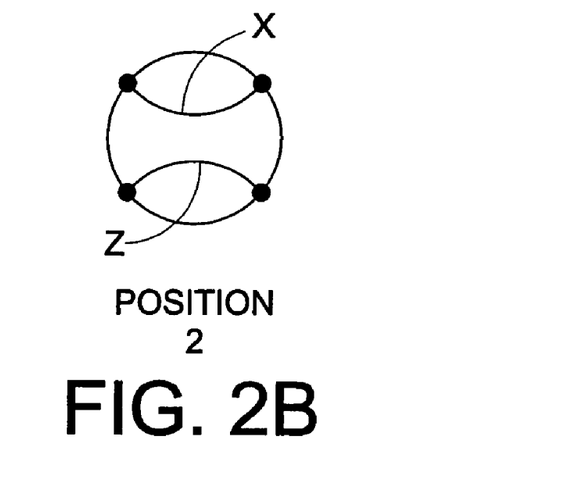

Valve 63 can be a two-position valve having a position 1 and a position 2 as shown in FIGS. 2A and 2B. Valve 63 includes two flow channels 90 and 92. In FIG. 1, valve 63 is shown in position 1 wherein flow channel 90 connects line 62 with a line 96 of first filter unit 20. In this position, the feed gas is directed through line 96 toward a filter bed A of first filter unit 20. When in position 2, flow channel 90, connects line 62 with a line 98 and directs the feed gas toward a filter bed B of unit 20. Lines 96 and 98 include bypass loops 100 and 102, respectively, which work in connection with the regeneration process and flow path 50, which will be discussed in greater detail below. The flow through bypass loop 100 is controlled by shutoff valves 106 and 108 and the flow through bypass loop 102 is controlled by shutoff valves 110 and 112.

With respect to flow path 40 and the feed gas, when filter bed A is in a filtering condition, valve 63 is in position 1, valve 106 is in an opened position and valve 108 is in a closed position. Under these conditions, the feed gas travels through line 62 through flow channel 90 of valve 63, through line 96 and past open valve 106 into filter bed A. Feed gas enters filter bed A at an end A1 and exits filter bed A at an end A2. The feed gas is filtered by the adsorbent in filter bed A such that when the feed gas enters line 118 at least one contaminant has been removed from or substantially reduced in it. The feed gas then travels through line 118 toward a second valve 120. When valve 63 is in position 1, the feed gas is not allowed to pass through filter bed B of unit 20 thereby allowing filter bed B to be regenerated while filter bed A is filtering the feed gas.

When valve 63 is switched to position 2, the feed gas passes through line 62 and into channel 90 which directs the feed gas into line 98 and flows towards filter bed B. When filter bed B is in the filtering condition, shut-off valve 110 is in the open position and shut-off valve 112 is in a closed position thereby preventing the fluid flow from entering bypass loop 102. The feed gas then travels through line 98, and is directed into filter bed B at an end B1, passes through it and exits it at an end B2. As with filter bed A, the at least one contaminant is removed from or substantially reduced in the feed gas before the feed gas enters line 122. The feed gas then travels through line 122 toward the second valve 120. Accordingly, by the time the feed gas enters the second valve 120, the at least one contaminant has been at least partially removed from the feed gas whether the feed gas has traveled through filter bed A or filter bed B.

The second valve 120 controls the flow of the feed gas between first filter unit 20 and second filter unit 30. Included in second valve 120 are flow channels 132 and 134. When the first valve 63 is in position 1 and the second valve 120 is in position 1, as is shown in FIG. 1, flow channel 132 fluidly connects line 118 and a line 140 thereby directing the fluid flow toward a third filter bed C in the second filter unit 30. In this position, flow channel 134 is removed from flow path 40. As can be appreciated, while flow path 40 maintains a fluid connection between inlet 42 and outlet 44, the flow path is defined along different pipes and/or ductwork based on the positioning of the valves. When the second valve 120 is switched to position 2, flow channel 132 directs the fluid flow from line 118 into a line 142 and toward a fourth filter bed D in the second filter unit 30.

However, when the first valve 63 is in position 2, feed gas enters the second valve 120 by way of line 122 such that when the second valve 120 is in position 1, the feed gas travels from line 122 into flow channel 134 which is in fluid communication with line 142. When the second valve 120 is in position 2 and the first valve 63 is in position 2, the feed gas flows through line 122 and into flow channel 134 thereby entering line 140 and filter bed C of second filtering unit 30 at an end C1 thereof. As the feed gas or fluid passes through filter bed C and exits at an end C2, at least one second contaminant is at least partially removed from the feed gas based on the adsorbent used in filter bed C. Accordingly, once the feed gas exits filter bed C into a line 144, the feed gas should be a clean or substantially clean product or fluid.

The clean product or fluid then travels toward a third valve 150 which includes flow channels 152 and 154. In position 1, which is shown in FIG. 1, line 144 is in fluid connection with an outlet line 160 by way of flow channel 152. Accordingly, when the second valve 120 and the first valve 63 are in position 1, the feed gas flows through filter bed C and through line 144. The clean product then flows through channel 152 and into line 160 thereby exiting flow path 40 at outlet 44. When the first and second valves 63 and 120 are positioned such that the feed gas travels through line 142 and enters filter bed D at an end D1 wherein the second contaminant is removed from the feed gas in similar fashion as filter bed C, feed gas exits filter bed D at an end D2 and the feed gas enters a line 164 as a clean product. The clean product then travels toward the third valve 150 which must be in position 2 such that flow channel 154 is in fluid communication with outlet line 160 allowing the fluid flow to reach outlet 44.

Essentially, the above description relates only to the flow of the feed gas through filter system 10. As will be discussed in greater detail below, a regeneration gas can travel through filter system 10 simultaneously with the flow of the feed gas. However, the regeneration gas travels through a separate regeneration flow path 50. While the regeneration flow path utilizes many common lines, pipes and/or ductwork as flow path 40, it is separated from flow path 40 at any given time and/or point. The many valves of the system direct fluid flow in the respective flow paths.

Figure 3:
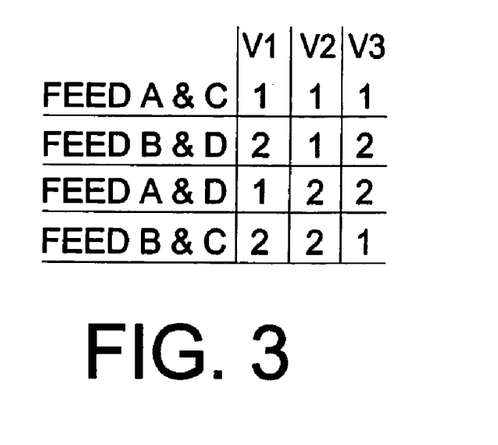
FIG. 3 is a chart showing the different feed arrangements.

Referring to FIG. 1, and with particular reference to valves 63 (V1), 120(V2) and 150 (V3) and the corresponding valve chart of FIG. 3, valves V1, V2 and V3 dictate a flow of gas along the flow path 40 by controlling fluid flow as follows:

Feed gas flows through filter beds A and C when V1 is in position 1 and V2 is in position 1. V3 needs to be in position 1 to allow the clean product to exit outlet 44.

Feed gas flows through filter beds B and D when V1 is in position 2 and V2 is in position 1. V3 needs to be in position 2 to allow the clean product to exit outlet 44.

Feed gas flows through filter beds A and D when valve V1 is in position 1 and V2 is in position 2. V3 needs to be in position 2 to allow the clean product to exit outlet 44.

Feed gas flows through filter beds B and C when V1 is in position 2 and V2 is in position 2. V3 needs to be in position 1 to allow the clean gas or fluid to exit outlet 44.

The positioning of the valves 63 (V1), 120 (V2) and 150 (V3) is controlled by systems control unit 76 which can allow for manual control of the valves and/or electro mechanical control of the valves based on a control card, computer apparatus and/or other controlling devices known in the art. System control 76 can be used to monitor and control all valves and all components in the filtering system 10. System control 76 can also be either hard wired to the valves or can utilize wireless technologies, as is known in the art.

Filter beds A, B, C, and D of filter system 10 can be utilized to remove a large range of contaminants from a feed gas. This can include the removal of toxic gasses such as carbon monoxide, nitrogen oxides, as well as traditional chemical warfare gasses such as cyanogen chloride, hydrogen cyanide, GB (sarin), and HD (mustard gas). Since the adsorption characteristics of this range of chemicals is so wide, it is difficult for a single filtering unit to filter all chemicals efficiently. That is the reason why different filtration media can be used in the two sets of filter beds. Filter beds A, B, C, and D can utilize adsorbents such as silica gels, alumina silicates, activated carbons (both coconut shell and/or coal-based), polymeric resins, and other synthetic microporous adsorbents. While applicants provide these examples, the invention of this application can be used in connection with other adsorbents and adsorbent configurations known in the art such as immobilized granular, cloth and clothlike materials, pleated adsorbent structures and extruded adsorbent particles and structures.

With respect to the remaining discussions, temperature regenerable adsorbents and the regeneration thereof will be discussed. However, it should be noted that this application should not be limited to any specific type of adsorbent material.

Regeneration of the filter beds, when thermal swing adsorbents are used, utilizes a regeneration gas which flows upstream through filter units 20 and 30 between the regeneration gas inlet 54 and the regeneration gas outlet 56 and flows through regeneration flow path 50. Regeneration can also utilize back-flow gasses which will be discussed below. A regeneration gas entering inlet 54 travels through line 172 toward the third valve 150. When the third valve 150 is in position 1, regeneration gas line 172 is in fluid communication with line 164 by way of flow channel 154 in the third valve 150. If the third valve 150 is in position 2, the regeneration gas passes from line 172 to line 140 by way of flow channel 152 in valve 3. Accordingly, as previously discussed with respect to the feed gas, the flow path of the regeneration gas is also controlled by the first, second and third valves 63, 120 and 150, respectively. Furthermore, as will be discussed in greater detail below, the regeneration flow path 50 utilizes much of the same pipe and/or ductwork as the feed gas flow path 40 depending on the position of the three valves 63, 120 and 150. With the third valve 150 in position 1, the regeneration gas passes through a heat exchanger 176 in line 164 which heats the regeneration gas to a desired temperature sufficient to regenerate the adsorbent in filter bed D. As will be appreciated, the temperature necessary to regenerate the adsorbent in filter bed D is based on the adsorbent used in filter bed D and the chemical nature of the contaminant(s). As with all the heat exchangers that will be discussed in this application, any heat exchanger known in the art for heating a fluid sufficient to regenerate the adsorbent can be used. Furthermore, the heat exchanges can also provide cooling capabilities and can be integrated with cooling/heating unit 68 to reduce regeneration cycle times.

The heat exchanger 176 can recover waste heat from the condenser of the cooling side of the cooling and/or heating unit 68, as is known in the art. That will provide some or all of necessary heat for the regeneration gas. In addition or alternatively, a separate heating source, not illustrated, may also be used to heat the regeneration gas.

Once the regeneration gas passes through heat exchanger 176 and is raised to the proper temperature, the heated regeneration gas enters filter bed D at end D2 and begins to heat the adsorbent in filter D to the desired temperature for regenerating the adsorbent. As will be appreciated, the adsorbent in filter bed D will begin to heat first at end D2 and the temperature change in the adsorbent will travel toward end D1 of filter bed D. Filter bed D can include a temperature sensor or a thermocouple 180 positioned between D1 and D2 of filter bed to monitor the temperature change in the adsorbent of the filter bed. Sensor 180 is spaced sufficiently far from end D1 to be in a position to determine the proper point in which to turn off heat exchanger 176 such that the heat remaining in heat exchanger 176 and within filter bed D will sufficiently heat the regeneration gas so that it can continue the regeneration of filter bed D all the way to its inlet D1. At the same time, the amount of energy utilized by heat exchanged of 176 during the regeneration cycle is minimized. Sensor 180 can also be used to prevent the overheating of the adsorbent in filter bed D.

As will be appreciated, both heat exchanger 176 and sensor 180 can also be connected to system control 76 so that the regeneration cycle of filter bed D can also be monitored and controlled. As the regeneration gas exits filter bed D at end D1, it enters line 142 which in this valve arrangement is part of flow path 50 of the regeneration gas. Further, while filter bed D is being regenerated, filter bed C is in flow path 40 and can be utilized to filter contaminants from the feed gas. The flow of the regeneration gas through unit 20 will be discussed in detail below.

When the third valve 150 is in position 2, filter bed D is no longer a part of flow path 50 and can be used to remove contaminants from the feed gas while filter bed C can be regenerated. More particularly, when the third valve 150 is in position 2, line 172 is connected to line 140 by flow channel 152 wherein line 144 becomes part of flow path 50. As the regeneration gas flows toward filter bed C, it passes through a heat exchanger 186 which is similar to heat exchanger 176 and the heated regeneration gas enters filter bed C at end C2 and travels through filter bed C toward end C1. Filter bed C can also include a temperature sensor or thermocouple 190 positioned between ends C1 and C2 to monitor the temperature change of the adsorbent in filter bed C. As with sensor 180, sensor 190 is positioned to detect the change in temperature of the adsorbent in filter bed C as it travels from end C2 to end C1 such that heat exchanger 186 can be turned off at the proper time for the heating wave front to reach sufficiently close to end C1 and so that the adsorbent is not overheated. Once the regeneration gas has exited end C1 of filter bed C, it enters line 140 and travels toward the second valve 120.

Depending on the position of the second valve 120, the flow of the regeneration gas will either be toward filter bed A or filter bed B of filter unit 20. The selection of whether the regeneration gas travels toward filter bed A or B is dependent on which of these filter beds needs to be regenerated. Furthermore, if neither filter bed A or filter bed B needs regeneration, system 10 includes bypass loops 100 and 102 so that the regeneration gas can bypass these two filter beds. As will be discussed in greater detail below, the contaminants that are filtered by filter beds C and D can be the type that require a regeneration of the third and fourth filter beds C and D more frequently than of filter beds A and B. As a result, if both filter beds A and B are in a clean and ready to filter condition, one of the bypass loops can be used to bypass the flow of regeneration gas to further improve the efficiencies of filter system 10. As can be appreciated, all of these conditions can be monitored and controlled by system control 76.

More particularly, with the third valve 150 in position 1 and the second valve 120 in position 1, the regeneration gas flows through filter bed D toward the second valve 120 and then passes through flow channel 134 of the second valve 120 into line 122 wherein line 122, which is now part of regeneration flow path 50. If regeneration is necessary for filter bed B, shut-off valve 112 will be in the closed position while shut-off valve 110 will be in the open position thereby allowing the flow path 50 of the regeneration gas to travel through a heat exchanger 196 and enter into end B2 of filter bed B. Filter bed B can also include a temperature sensor or thermocouple 200 for tracking the temperature change of the adsorbent in filter bed B. As with filter beds C and D, sensor 200 is sufficiently spaced from end B1 to communicate with system control 76 such that control 76 can turn off heat exchanger 196 at the precise time to maximize efficiencies and/or productivities depending on which is the most important.

If both filter beds A and B are in a clean condition, bypass loop 102 can be utilized to bypass filter bed B and pass the regeneration gas toward the first valve 63 without affecting filter bed B. For gas to pass through bypass loop 102, shut-off valve 112 is in the open position while shut-off valve 110 is in the closed position. Regardless of whether or not bypass loop 102 is utilized, regeneration gas passes through line 98 toward the first valve 63. In position 1, the first valve 63 directs the flow of the regeneration gas through flow channel 92 and into exit line 204 so that it can exit regeneration gas outlet 56.

When the second valve 120 is positioned such that the regeneration gas enters line 118 (either a) valve 120 in position 1 and valve 150 in position 2 or b) valve 120 in position 2 and valve 150 in position 1), filter bed A can be regenerated. Similarly to filter bed B, filter bed A includes a heat exchanger 206 and a temperature sensor or thermocouple 210. When filter bed A needs regeneration, bypass loop 100 is closed off such that shut-off valve 108 is in the closed position and shut-off valve 106 is in the open position thereby allowing the regeneration gas to flow through heat exchanger 206 which sufficiently heats the regeneration gas to the desired temperature necessary to regenerate the adsorbent used in filter bed A. As previously discussed, filter bed A can utilize a temperature sensor 210 to monitor the heat flow from end A2 to end A1 of filter bed A to determine the proper time in which to shut-off heat exchanger 206. As with the other sensors and heat exchangers, sensor 210 and heat exchanger 206 can be connected to system control 76 so that control 76 can turn off heat exchanger 206 at the optimal time.

If regeneration of filter bed A is not needed, shut-off valve 108 can be in the open position while shut-off valve 106 can be in the closed position, thus employing bypass loop 100. This will re-route the regeneration gas around filter bed A into line 96 toward the first valve 63. Whether or not bypass loop 100 is utilized or the regeneration gas flows through filter bed A, valve 63 needs to be in position 2 such that line 96 is in fluid communication with an exit line 204 by way of flow channel 92 and flows out regeneration gas outlet 56.

As can be appreciated, based on the positioning of the three valves 63, 120 and 150 valves, either of filter beds A and B and either of filter beds C and D can be regenerated simultaneously while the other filter beds are used to filter contaminants.

The regeneration gas or purge gas can be pulled from a clean environment to regenerate at least one of filter beds A, B, C, and D. The regeneration gas used can be a portion of the clean gas exiting at the clean product outlet 44. To this end, a conduit 220 can connect the clean product outlet 44 to the regeneration inlet 54. Furthermore, a regeneration pump 214 can be positioned near outlet 56. Thus, regeneration can be done under a slight vacuum which further increases the efficiency of the regeneration step. This is especially true for weakly adsorbed vapors, which will be discussed in greater detail below. It would also be conceivable to employ only partially filtered gas for this purpose, although this approach is not favored.

In operation, system 10 can work as follows. Starting with the filter bed A, a feed gas is introduced into system 10 wherein the first valve 63 is in position 1 to direct the feed gas to filter bed A. Over time, the effluent concentrations of a single contaminant, or more than one contaminant, in filter bed A begins to rise. The time that bed A may remain online or on stream and filter the feed gas, depends on many factors including the concentration of the contaminants in the feed gas and the amount of adsorbents in filter bed A. The feed gas temperature and the chemicals to be filtered from the feed gas also affect the amount of time that filter bed A can be maintained online.

Before the contaminants in filter bed A reach an unacceptable effluent concentration, feed gas is redirected from filter bed A to filter bed B by changing the first valve 63 from position 1 to position 2, as shown in FIGS. 2A and 2B. It should be noted that if the same filter bed of the second filter unit 30 is to be maintained online, the position of the second valve 120 must also be changed at the same time that the position of the first valve 63 is changed to maintain the flow of feed gas through the same filter bed in the second filter unit 30. At this time, filter bed A must be regenerated while filter bed B is filtering the feed gas. As is set forth above, the regeneration of filter bed A can be from the regeneration gas entering filter system 10 from regeneration gas inlet 54.

The regeneration step is divided into two parts, namely, heating and cooling. The heating part of the regeneration step or cycle can be accomplished as described above by utilizing heat exchanger 206 thereby heating the regeneration gas before it enters end A2 of filter bed A. Heat exchanger 206 heats the regeneration gas before it enters the filter bed. It should be noted that other methods of heating the adsorbent which are known in the art may be utilized. These approaches include bed resistance heating and in-bed heating elements. The purpose of the heating step is to raise the partial pressure of the adsorbed contaminants so that as little purge gas as is necessary is needed to regenerate the bed. After the heating step is completed, which as stated above can be monitored by a temperature sensor or thermocouple positioned within filter bed A, filter bed A must be cooled back to or near the feed gas temperature to maximize the filtering properties of the adsorbent. In this respect, exposing filter bed A to the feed gas before it has cooled sufficiently can result in immediate or near immediate breakthrough of contaminants into the effluent product gas exiting the filter bed. Accordingly, monitoring and properly controlling the regeneration step improves efficiency and filtering properties of the system.

The remaining filter beds B, C and D are generally regenerated in a similar fashion. Obviously, the valve arrangements will be different, however.

In operation, first filter unit 20 can operate independently from second filter unit 30 thereby maximizing the efficiencies of the respective filtering unit. In this respect, filtering units 20 and 30 can be utilized to filter a different contaminant or a different group of contaminants from the feed gas. As a result, filter unit 20 can be specifically designed and configured for the particular contaminant or group of contaminants instead of having to be configured to be utilized for all contaminants. This specialized approach of employing different filter units for different types of contaminants allows each filter unit to be highly efficient for its particular contaminant or group of contaminants.

It should be noted that while only two filter units are shown in connection with the description of this application, additional filter units can be utilized to filter a third, fourth, fifth, etc. group of contaminants from the feed gas. In addition, more than two filter beds can be utilized for either or both filter units 20 and 30 or any other filter units that are used in connection with filter system 10 without detracting from the invention of this application. This is especially important if the feed gas includes a high concentration of contaminants to be filtered wherein the saturation rates of a filter bed is less than the regeneration cycle of the offline filter bed. Overcoming this condition can be handled either by utilizing differently configured filter beds, such as larger filter beds that hold additional adsorbent, or by utilizing more than two filter beds.

In order to maximize the efficiency of the filter units 20 and 30 which are used to remove a different contaminant or group of contaminants from the feed gas, system control 76 allows filter units 20 and 30 to operate independently of one another. In one filtering arrangement, the range of potential feed chemicals can be broken into two general chemical categories, namely, high boiling vapor chemicals and low boiling vapor chemicals. The high boiling vapor chemicals can be filtered by the first unit 20 while the low boiling vapor chemicals can be filtered by the second unit 30. More particularly, high boiling vapor chemicals such as mustard gas or dioxin are normally strongly adsorbed. In other words, the adsorbent can accumulate a large adsorbed phase concentration (loading) of the chemical. Thus, the loading of the adsorbent is high, even at a very low concentration of the chemical (e.g. 1–10 ppm.) in the feed gas. Since high boiling vapor chemicals have such a low volatility, the feed gas concentration of these chemicals will typically be very low. This is a result of the vapor pressure of the pure liquid being low at room temperature.

Since the heat adsorption is typically very high for these types of vapors, the change in loading as a function of the temperature of the feed gas and the concentration of the contaminant is small. More particularly, the adsorbent loading of these strongly adsorbed vapors is relatively unaffected by the concentration of the chemical in the feed gas and the temperature of the feed gas. As a result, a small amount of adsorbent can retain a relatively large amount of the contaminant. Therefore, the filter beds used for the high boiling vapor chemicals can be maintained online or on stream for an extended period of time as compared to those used for low boiling vapor chemicals and can be smaller. However, the temperature required for effectively removing these adsorbed gasses (regenerating the filter bed) is relatively high.

Conversely, low boiling vapor chemicals, such as hydrogen cyanide and ammonia are weakly adsorbed chemicals. Further, these vapors can be introduced in much higher concentrations than high boiling vapor chemicals. The amount of chemical adsorbed from the feed gas per unit mass of adsorbent is much lower for low boiling chemicals. This is true even at elevated feed concentrations. Also, weakly adsorbed chemicals can typically be displaced by adsorbed water which can be present in the feed gas entering system 10. The loadings for low boiling chemicals are typically much lower (an order of magnitude or more) than a high boiling chemical at the same vapor phase concentration. As a result, even under optimal conditions, much more adsorbent is required for low boiling chemicals than for high boiling chemicals. In addition, the relative loadings of low boiling chemicals are much more sensitive than high boiling chemicals to both temperature and water loading (relative humidity). Therefore, the amount of adsorbent required to retain such low boiling chemicals can be significantly reduced by maintaining the feed gas at an optimum temperature and relative humidity.

Nonetheless, as should be appreciated, the filter beds utilized in connection with low boiling vapor chemicals can be very different than the filter beds utilized to filter high boiling vapor chemicals. Filter system 10 allows each filter bed to be optimized based on the particular contaminant to be filtered by the independent nature of each filter unit. Filter system 10, as shown in FIG. 1, represents one particular configuration of filtering systems according to the present invention which utilizes two filter units 20 and 30 each having two filter beds A, B, C, and D, respectively.

Filter beds A and B of unit 20 are filled with adsorbent to remove high boiling vapor chemicals in the feed gas. The cycle time for filter beds A and B is greater than one hour. A cycle time of two hours means that each bed is on stream for one hour and, therefore, the entire regeneration step including both heating and cooling of the regenerated filter bed must be accomplished in one hour. The regeneration temperature range for beds A and B can be between approximately 90° C. and 200° C. For example, it can be about 125° C. if desired. Water adsorption can be of little concern in filter beds A and B if the adsorbent chosen is sufficiently hydrophobic so that the strongly adsorbed contaminant materials are not affected. For example, a 13× molecular sieve might not be an appropriate choice for filter beds A and B in this particular arrangement. A less hydrophilic adsorbent, such as silica gel, might be more appropriate.

Conversely, filter bed C and D of unit 30 can be designated to remove the weakly adsorbed low boiling vapor chemicals. Under these circumstances, the cycle time for filter beds C and D can range between 10 minutes to 90 minutes, even though additional adsorbent is utilized in these filter beds. For example, the cycle times for these filter beds are often approximately 20 minutes. The regeneration temperature for filter beds C and D can be on the order of only 75° C. Thus, the regeneration temperature of the filter beds in the second unit 30 is lower than the regeneration of the filter beds in the first unit 20. Since water adsorption is a greater concern for the filter beds in the second unit 30, the humidity of the feed gas should be controlled, as previously discussed. It is considered advantageous to remove the high boiling point chemicals first (via filter unit 20) and that the lower boiling point chemicals (via filter unit 30), since the short cycle time filters C and D need to be regenerated much more frequently than the long cycle time filters A and B.

As a result of the independent cycle control, the high regeneration temperature necessary to regenerate filter beds A and B is only necessary every two hours instead of every 20 minutes based on the cycle times of beds C and D. If these high temperatures were utilized for all four filter beds A, B, C, and D, the energy consumed by the filter system would be much higher. While energy conservation may not be a concern in industrial settings, where a heated gas, such as steam, may be plentiful, energy efficiency is a concern in non-industrial settings. Further, if the 20 minute cycle times were used for all filter beds, energy consumption would also be much higher. By operating filter unit 20 independently of filter unit 30, the filter system does not need to regenerate all filter beds based on the fastest breakthrough chemical, namely, a chemical which is weakly adsorbed, and does not need to create a regeneration temperature based on a strongly adsorbed chemical. Thus, the amount of energy needed to operate the system disclosed herein is significantly reduced from what is known in the art.

Another advantage of operating filter unit 20 independently of filter unit 30 is that the adsorbent of each filter bed is not overheated. In this respect, utilizing a single temperature regeneration gas for all filter beds, regardless of the adsorbent utilized and the contaminate being filtered, not only results in higher energy consumption, but also can produce an overheating of the particular adsorbent utilized to filter the contaminant. This decreases the likelihood of potentially deleterious chemical reactions. Furthermore, utilizing temperature sensors within the filter beds also helps prevent overheating of the adsorbent material in each of the filter beds by allowing system control 76 to monitor the heating of the adsorbent and to determine the optimal time to shut off the heating of the regeneration gas to prevent overheating and to minimize the regeneration cycle time. As stated above, this includes both heating the adsorbent for regeneration and cooling the adsorbent to feed gas temperature so that the bed can be put online or in stream only after the adsorbent is at the proper temperature. Again, an elevated temperature in the adsorbent when online can reduce filter efficiency and can shorten the life span of the adsorbent material.

Figure 4:
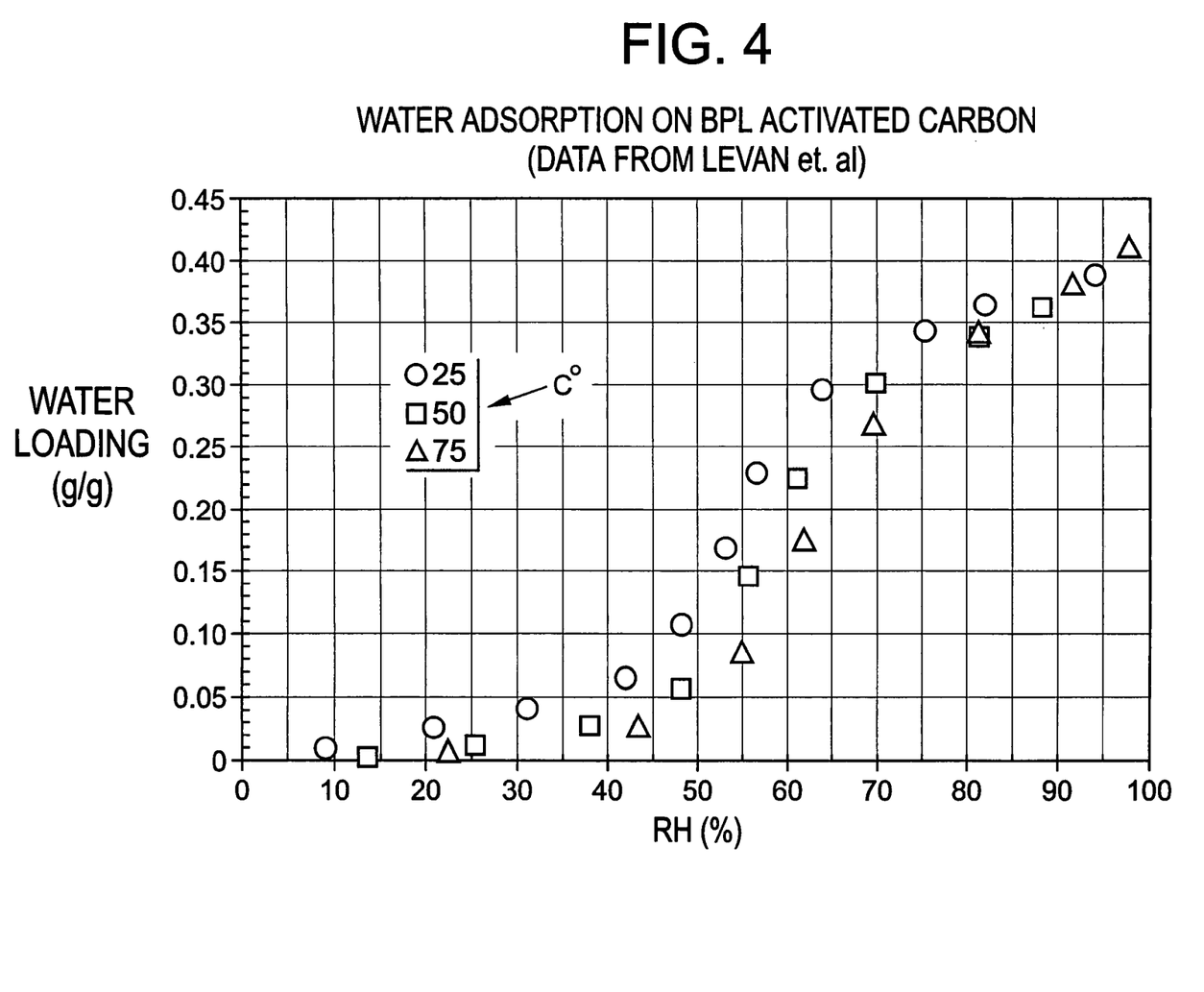
FIG. 4 is a schematic diagram of water adsorption on BPL activated carbon.

In another embodiment of the present invention, the relative humidity of the feed gas can be monitored and controlled to further increase the efficiency of at least one of filter units 20 and 30 of filter system 10. In this respect, adsorbed water is a large contributor to the reduction of filter efficiencies and the increase in energy consumption of the filter system. Referring to FIG. 4, shown is water loading in relation to relative humidity for BPL activated carbon (BPL is a brand name of Calgon Carbon Corp. of Pittsburgh, Pa.). The data in the figure are measured at three different temperatures, namely, 25° C., 50° C. and 75° C. The X axis is the relative humidity which is defined as the vapor pressure of water divided by the saturation vapor pressure of water in air at a given temperature. The Y axis is the water loading expressed as grams of water adsorbed per gram of BPL carbon. This figure shows that there is a large increase in the water adsorption between about 45% RH and 80% RH.

Figure 5:
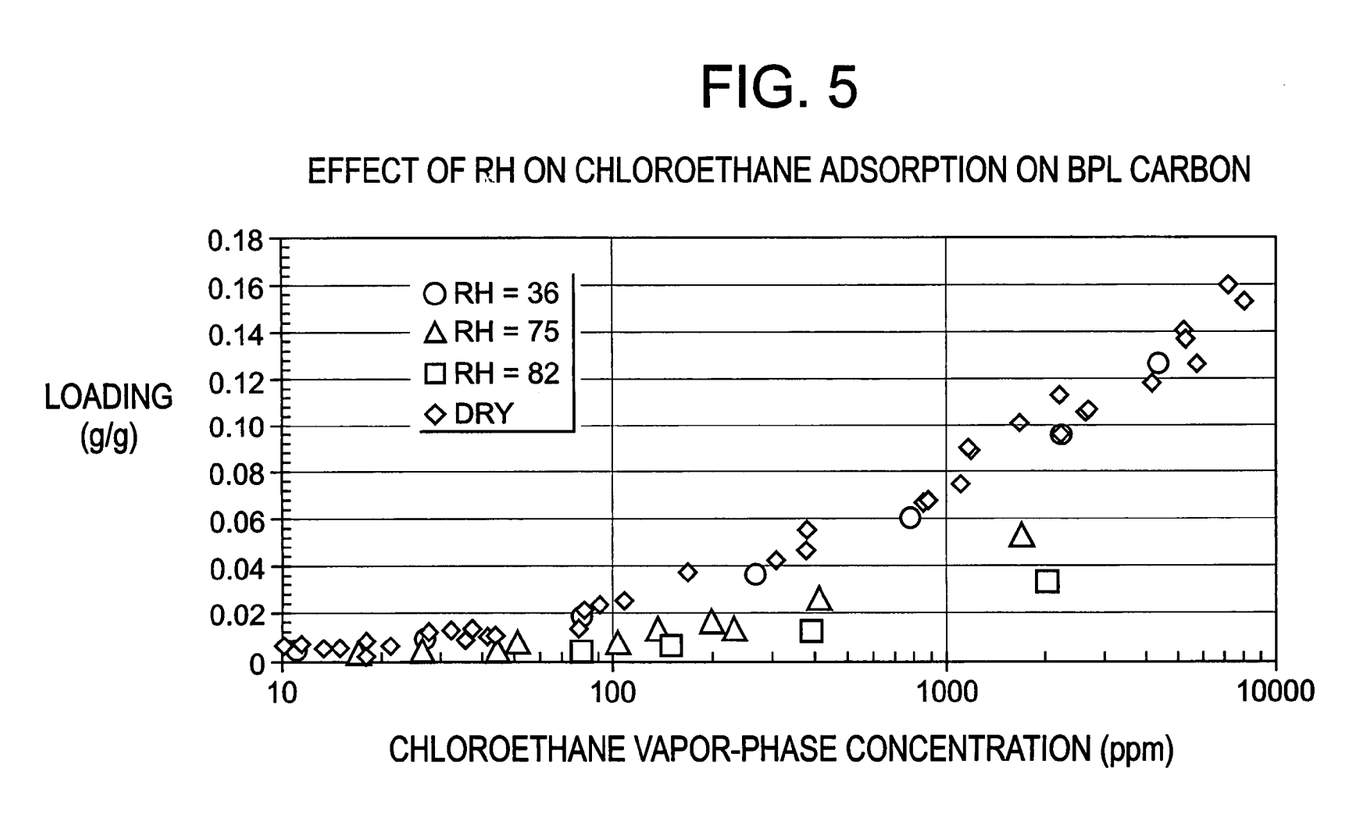
FIG. 5 is a schematic diagram of the effect of relative humidity on chloroethane adsorption on BPL activated carbon.

Referring to FIG. 5, shown is the effect of relative humidity on chloroethane adsorption, a representative weakly adsorbed vapor at four different relative humidities, namely dry, 36% RH, 72% RH and 80% RH. This data reflects what is shown in FIG. 4. For example, at 36% RH, the amount of chloroethane loaded is almost the same as measured for chloroethane loading under dry conditions. However, at 72% RH and 80% RH, the amount of chloroethane adsorbed is significantly reduced.

The following calculation demonstrates the deleterious effect of the relative humidity from an energy consumption perspective. The heat capacity of BPL carbon is about 0.25 cal/g/° C. In order to heat 10 g of carbon from 25° C. to 125° C., this would require at a minimum, 100° C.*10 g of carbon*0.25 cal/g/° C.=250 cal=0.25 Kcal .

As a result, 0.25 Kcal of energy is required to achieve this change in temperature. However, the same 10 g of carbon exposed to 80% RH air at 25° C. during the filtering process, would require additional energy. In this respect, the heat of vaporization of water equals 9.72 Kcal/mol water=0.54 Kcal per gram water. Water loading at 25° C. and 80% RH from FIG. 2=0.35 g/water/g carbon. Accordingly, the energy necessary to produce a 100° C. temperature change of the 10 grams of carbon would be as follows:

100° C.*10 g of carbon*0.25 cal/g/° C.+0.35 g water/g carbon*10 g carbon*0.54 Kcal/g water evaporated=2.14 Kcal.

Therefore, if the carbon is exposed to 80% RH, the amount of energy required to heat the adsorbent to the same temperature has increased by more than eight times. Therefore, controlling the relative humidity of the incoming the feed gas can significantly improve the efficiency of filter system 10 by reducing the energy necessary to raise the adsorbent in the filter bed to the temperature necessary for regeneration.

Moisture in the feed gas also reduces the efficiency of the adsorbent in the filtering step which further reduces the filtration efficiencies of the filter system. Referring to FIG. 5, an example of this is shown. In this respect, considering a chloroethane vapor concentration of 400 ppm, the following example is provided. At 36% RH, the loading of the chloroethane is about 0.05 g/g. However, at 80% RH, the chloroethane loading is only about 0.015 g/g. As a result, if everything else is held equal, if the relative humidity of the feed gas is increased from 36% RH to 80% RH, the amount of adsorbent required to retain chloroethane at 400 ppm will increase by 330%. Furthermore, all of the extra adsorbent needed for filtering the 400 ppm of chloroethane would also have water adsorption in the range of 0.35 g per g which would require additional regeneration energy in the magnitude of 330% greater. Accordingly, maintaining a low relative humidity of the feed gas improves efficiencies both in the filtration process and in the regeneration process and further reduces the amount of adsorbent used in the particular filter beds.

In yet another embodiment of the present invention, the feed temperature is monitored and controlled to further improve the efficiency of system 10. Furthermore, the temperature of the feed gas flowing through the different filtering units 20 and 30 can also be monitored and changed by utilizing sensors in the feed lines, not shown, or heating and/or cooling units between the filtering system, also not shown. In this respect, different adsorbent materials operate at different efficiencies at different operating temperatures. Based on the contaminant or groups of contaminants in the feed gas and the adsorbents utilized to remove the contaminant or groups of contaminants from the feed gas, controlling the temperature of the feed gas can allow the system to operate at desired temperatures for optimizing the efficiency of the particular filter beds.

In yet another embodiment of the invention, both the relative humidity and the feed temperature can be controlled to even further maximize the efficiency of system 10. In this respect, the efficiency of the system is improved when water vapor can pass through the system without subjecting the water vapor to phase change, namely, adsorption or condensation. While lower temperatures can favor the adsorption of weakly adsorbed chemicals, lower temperatures can directly decrease the adsorption capacity of low boiling vapors by increasing the relative humidity (thus the water loading) of the feed gas. Accordingly, in systems which utilize adsorbents that require cool feed gas in order to effectively remove low boiling chemical vapors, the relative humidity of the feed gas needs to be reduced to reduce the amount of adsorbed water. One potential approach is to first cool the feed gas to a temperature that is 5° C. to 10° C. below the desired filter operating temperature to condense water, then reheat the gas to the desired feed temperature to reduce the relative humidity. This of course, assumes that the fed gas is at an unacceptably high relative humidity entering the system. Alternatively, if adsorbents are utilized that perform adequately at elevated temperatures, the relative humidity can be reduced simple by heating the feed gas. The optimal combination of maintained relative humidity and maintained feed temperature is dependant on the adsorbents utilized in view of the contaminants which are designed to be removed from the feed gas. This determination is a multi-step process wherein, first, the design-limiting weakly adsorbed vapor is determined, then the adsorbent necessary to adsorb this contaminant is chosen. Then, the optimal relative humidity and temperature range for the system can be determined.

While reducing the relative humidity in feed gas improves the efficiency of the system, it has been found that completely eliminating all humidity is not the optimal condition in that removing moisture also requires energy. Conversely, it has been found that a relative humidity of about 30–45% produces the optimal efficiency in the system when microporous, carbonaceous adsorbents are used. Since humidity control of the feed gas is much more important with respect to the second filter unit 30 than the first filter unit 20, it would be possible to locate the cooling and/or heating unit 68 and humidity control 70 between the first and second filter units rather than before the first filter unit.

In a further embodiment, cooling and heating unit 68 along with the temperature and humidity control 70 can be utilized to help regulate the temperature and humidity of the protected vessel or structure in which the filter system is utilized. In this respect, this filter system can be used in connection with structures or vehicles employed to protect people from harmful gasses, including toxic gasses such as those used against military personnel. Thus, the system 10 can be used on Army, Navy or Air Force vehicles or on stationary structures or buildings, used by military or civilian personnel. As can be appreciated, the filter system of this application can be utilized to protect people from toxic gasses resulting from military activity and/or terrorist attacks. The cooling and/or heating unit(s) can also be utilized to create a desired temperature and humidity level in the vessel or structure.

While considerable emphasis has been placed on the preferred embodiments of the invention illustrated and described herein, it will be appreciated that other embodiments can be made and that many changes can be made in the preferred embodiments without departing from the principles of the invention. It is intended to include all such modifications and alterations insofar as they come within the scope of the appended claims or the equivalents thereof.

Having thus described the invention, it is so claimed:

1. A regenerable filter system comprising:
    a flow path along which a stream of fluid flows between an inlet and an outlet;
    a first filtering unit in said flow path between said inlet and said outlet, said first unit comprising first and second regenerable filter beds, each bed including a first adsorbent for removing a first contaminant from said stream of fluid;
    a first valve located between said inlet and said first and second filter beds for selectively directing said stream of fluid through either one of said first and second filter beds, the other of said first and second filter beds being removed from said flow path;
    a second filtering unit in said flow path between said first filtering unit and said outlet, said second unit being located downstream from said first unit and including third and fourth regenerable filter beds, each bed including a second adsorbent for removing a second contaminant from said stream of fluid;
    a second valve located between said first filtering unit and said third and fourth filter beds for selectively directing said stream of fluid through either one of said third and fourth filter beds independent of said first valve, the other of said third and fourth filter beds being removed from said flow path; and,
    a controller, said controller operating said first valve to direct said stream of fluid through a desired one of said first and second filter beds and operating said second valve to direct said stream of fluid through a desired one of said third and fourth filter beds, wherein said first and second filtering units are operated independent of one another.

2. The regenerable filter system of claim 1, further including a bypass loop for bypassing at least one of said first and second filter beds, said bypass loop including an upstream valve and a downstream valve for preventing fluid flow through said one filter bed.

3. The regenerable filter system of claim 2, wherein said bypass loop comprises a first bypass loop and said system further includes a second bypass loop for bypassing the other of said first and second filter beds, said second bypass loop including an upstream valve and a downstream valve for preventing fluid flow through said other filter bed.

4. The regenerable filter system of claim 1, further including a first heat exchanger in said flow path between said first filter bed and said second valve, said first heat exchanger producing a regeneration heat necessary to regenerate said first filter bed.

5. The regenerable filter system of claim 4, further including a second heat exchanger in said flow path between said second filter bed and said second valve, said second heat exchanger producing a regeneration heat necessary to regenerate said second filter bed.

6. The regenerable filter system of claim 1, further including a third valve in said flow path between said second filtering unit and said outlet, said third valve selectively directing said stream of fluid from said one of said third and fourth filter beds to said outlet.

7. The regenerable filter system of claim 6, further including a third heat exchanger also in said flow path and between said third filter bed and said third valve, said third heat exchanger producing a regeneration heat necessary to regenerate said third filter bed.

8. The regenerable filter system of claim 7, further including a fourth heat exchanger in said flow path between said fourth filter bed and said third valve, said fourth heat exchanger producing a regeneration heat necessary to regenerate said fourth filter bed.

9. The regenerable filter system of claim 1, wherein said controller controls first and second regeneration cycles for said first and second filtering units.

10. The regenerable filter system of claim 9, wherein said controller is configured such that said first and second regeneration cycles are unequal in duration.

11. The regenerable filter system of claim 1, wherein said stream of fluid includes moisture and said system further including a device in said flow path between said inlet and said first filtering unit for removing a portion of said moisture from said stream of fluid.

12. The regenerable filter system of claim 11, wherein said device comprises an inline cooler in said flow path.

13. The regenerable filter system of claim 1, further including an air pressuring member upstream from said first valve.

14. The regenerable filter system of claim 1, wherein said first and second filter beds each house a set amount of said first adsorbent and said third and fourth filter beds each house a set amount of said second adsorbent, said set amount of said first adsorbent being unequal to said set amount of said second adsorbent.

15. The regenerable filter system of claim 1, wherein said first and second filter beds each have a filter housing with a first length and said third and fourth filter beds each have a filter housing with a second length, said first length and said second length being unequal.

16. The regenerable filter system of claim 1, further including an inline temperature controller in said flow path for maintaining said stream of fluid at a specified temperature as it enters said first filtering unit.

17. The regenerable filter system of claim 1, wherein said first and second adsorbents comprise temperature swing adsorbents, said first and second filter beds being regenerated at a first regeneration temperature, said third and fourth filter beds being regenerated at a second regeneration temperature.

18. The regenerable filter system of claim 1, further including a first temperature sensor in said first filter bed and a second temperature sensor in said second filter bed, said first and second temperature sensors being in communication with said controller and one of said first and second sensors governing a regeneration cycle of said first filter unit.

19. The regenerable filter system of claim 1, further including a third temperature sensor in said third filter bed and a fourth temperature sensor in said fourth filter bed, said third and fourth temperature sensors being in communication with said controller and one of said third and fourth sensors governing a regeneration cycle of said second filter unit.

20. The regenerable filter system of claim 1, wherein said first and second adsorbents comprise a material selected from silica gels, alumina silicates, activated carbons, polymeric resins and combinations thereof.

21. The regenerable filter system of claim 1, wherein at least one of said first and second adsorbents includes more than one adsorbent material.

22. A method of removing at least a first and a second contaminant from a stream of fluid, said method including the steps of:
providing said stream of fluid;
directing said stream of fluid through a filtering system having a first filtering unit with first and second regenerable filter beds and a second filtering unit with third and fourth regenerable filters beds, said first and second filtering units being in fluid connection with one another;
filtering a first contaminant from said stream of fluid in said first filtering unit
filtering a second contaminant from said stream of fluid in said second filtering unit;
regenerating one of said first and second filter beds of said first filtering unit; and,
regenerating one of said third and fourth filter beds of said second filtering unit independent of said step of regenerating said one of said first and second filter beds.

23. The method of claim 22, further including the step of changing the temperature of said stream of fluid.

24. The method of claim 23, further including the step of cooling said stream of fluid before one of said filtering steps.

25. The method of claim 23, further including the step of heating said stream of fluid before one of said filtering steps.

26. The method of claim 23, further including the step of cooling said stream of fluid and then heating said stream of fluid before one of said filtering steps.

27. The method of claim 22, further including the step of regulating a duration of said step of regenerating said one of said first and second filter beds of said first filtering unit by sensing temperature in said first and second filter beds.

28. The method of claim 22, further including the step of regulating a duration of said step of regenerating said one of said third and fourth filter beds of said second filtering unit by sensing temperature in said third and fourth filter beds.

29. The method of claim 22, wherein said regenerating said one first and second filter beds is for a first regeneration cycle and said regenerating said one third and fourth filter beds is for a second regeneration cycle, said first and second regeneration cycles being unequal in duration.

30. The method of claim 22, wherein said regenerating said one first and second filter beds is for a first regeneration cycle and said regenerating said one third and fourth filter beds is for a second regeneration cycle, said method further including the step of controlling said first and second regeneration cycles based on at least one physical characteristic of the respective first and second filter beds.

31. The method of claim 22, further including the step of changing the humidity of said stream of fluid.

32. The method of claim 22, wherein one of said first and second contaminants is a high boiling vapor chemical.

33. The method of claim 32, wherein the other of said first and second contaminants is a low boiling vapor chemical.

34. The method of claim 22, wherein said regenerating said one first and second filter beds comprises the steps heating a purge fluid, passing the purge fluid through one of said first and second filters beds, heating said one of said first and second filter beds and extracting a chemical from the fluid.

35. The method of claim 34, further including the step of sensing temperature in said one first and second filter beds.

36. The method of claim 35, further including the step of cooling said one first and second filter beds when temperature sensed reaches a set point.

37. The method of claim 22, wherein said step of regenerating said one of said first and second filter beds is for a first regeneration cycle and said step of regenerating said one of said third and fourth filter beds is for a second regeneration cycle, said first regenerating cycle being about 60–180 minutes.

38. The method of claim 37, wherein said first regenerating cycle is about 2 hours.

39. The method of claim 37, wherein said second regenerating cycle is about 10–90 minutes.

40. The method of claim 39, wherein said second regenerating cycle is about 20 minutes.

41. The method of claim 22, wherein said regenerating comprises the steps of heating a filter bed at a first end thereof, sensing temperature of said filter bed between said first end and a second end, begin cooling said filter at said first end before said second end is heated to a predetermined temperature.

42. The method of claim 22, further including the step of maintaining said stream of fluid at a relative humidity of between 30% to 45% before said step of directing said stream of fluid.

43. The method of claim 22, wherein said step of regenerating said one of said third and fourth filter beds of said second filtering unit comprises the steps heating a purge fluid, passing the purge fluid through one of said third and fourth filters beds, heating said one of said third and fourth filter beds and extracting a chemical from the one of said third and fourth filter beds.

44. The method of claim 43, wherein said first filtering unit includes a bypass loop and said regenerating said one of said third and fourth filter beds of said second filtering unit includes the step of bypassing said first filtering unit.

45. A regenerable filter system comprising:

a first flow path along which a stream of process fluid flows between a process fluid inlet and a process fluid outlet;

a first filter unit in said first flow path, said first filter unit comprising a first regenerable filter bed having a first adsorbent for removing a first contaminant from said stream of fluid;

a second filter unit in said first flow path, said second unit being located between said first unit and said outlet of said first flow path, said second unit comprising a second regenerable filter bed having a second adsorbent for removing a second contaminant from said stream of fluid;

a second flow path along which a stream of regeneration fluid flows between a regeneration fluid inlet and a regeneration fluid outlet;

a controller for selectively directing said process fluid through said first flow path and said regeneration fluid through said second flow path, wherein a regeneration cycle of said first filter unit is independent of a regeneration cycle of said second filter unit.

46. The regenerable filter system of claim 45, wherein regeneration is thermal regeneration and regeneration temperatures of said first and second filter units are different.

47. The regenerable filter system of claim 45, wherein said controller is configured such that said regeneration cycles of said first and second filter units are of different durations.

48. The regenerable filter system of claim 47, wherein said controller is configured such that intervals between said regeneration cycles of said first and second filter units are different.

49. The regenerable filter system of claim 45, further comprising a first valve located between said process fluid inlet and said first filter unit in said first flow path and between said regeneration fluid outlet and said first filter unit in said second flow path, and a second valve located between said first filter unit and said second filter unit, said first and second valves directing said flow of said process fluid and said regeneration fluid.

50. The regenerable filter system of claim 49, further comprising a third valve located between said regeneration fluid inlet and said second filter unit in said second flow path and between said process fluid outlet and said second filter unit in said first flow path, said third valve further directing said flow of said process fluid and said regeneration fluid.

51. The regenerable filter system of claim 45, further comprising a temperature control system for maintaining a desired temperature of said process fluid.

52. The regenerable filter system of claim 45, further comprising a humidity control system for regulating a humidity of said process fluid.

53. The regenerable filter system of claim 45, further comprising a first heater for heating said regeneration fluid to a desired regeneration temperature, wherein regeneration is a thermal regeneration.

54. The regenerable filter system of claim 53, further comprising a second heater for heating said regeneration fluid to a desired temperature, wherein said first heater is located adjacent said first filter unit and said second heater is located adjacent said second filter unit.

55. The regenerable filter system of claim 53, wherein said first heater comprises a heat exchanger.

56. The regenerable filter system of claim 45, further comprising a pressurization system for said process fluid.

* * * * *